Nov. 15, 1960 R. HOFER 2,960,669

AMPLITUDE MODULATION WITH LINEAR FREQUENCY CHARACTERISTIC

Filed June 20, 1957

Inventor.
Rudolf Hofer.
By [signature] Atty.

United States Patent Office 2,960,669
Patented Nov. 15, 1960

2,960,669

AMPLITUDE MODULATION WITH LINEAR FREQUENCY CHARACTERISTIC

Rudolf Hofer, Berlin-Siemensstadt, Germany, assignor to Siemens and Halske Aktiengesellschaft, Berlin and Munich, Germany, a corporation of Germany Filed June 20, 1957, Ser. No. 666,970

Claims priority, application Germany July 4, 1956

1 Claim. (Cl. 332—63)

This invention relates to amplitude modulation and is particularly concerned with modulation of television transmitters with picture frequency mixtures.

For the amplitude modulation of high frequency transmitters, especially for the broad-band modulation of television transmitters, there is frequently employed a circuit comprising an HF-terminal tube connected in series with a modulation tube lying in the cathode branch thereof.

The invention proposes to provide with simple means for simultaneous linearization of the modulation characteristic and for independence thereof on the carrier level.

Figure 1:
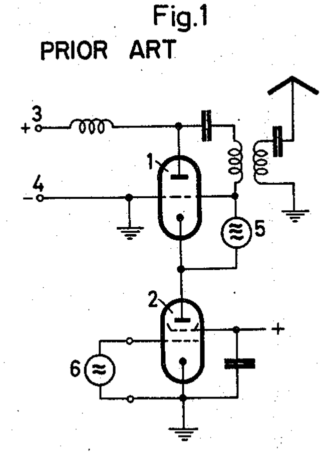
Fig.1 PRIOR ART
Figure 2:
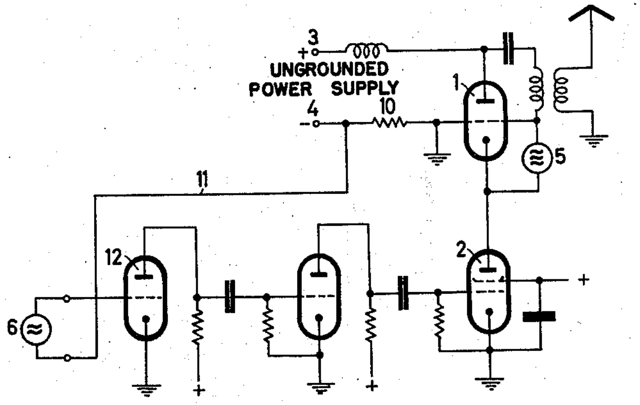

The various objects and features of the invention will appear from the description which will be rendered below with reference to the accompanying drawing, wherein Fig. 1 shows a basic circuit for amplitude modulation as indicated before; and Fig. 2 shows a basic circuit to give an example of the invention.

In Fig. 1, there is provided a high frequency tube 1 and a low frequency tube 2. The D.C.-plate potential for the two tubes is supplied over terminal points 3 and 4. Between the grid and cathode of the high frequency tube 1 is connected the high frequency carrier voltage 5, and between the grid and cathode of the low frequency tube 2 is connected the low frequency voltage 6, for example, the picture frequency mixture of a television transmitter.

The high frequency tube 1 represents in the circuit the load impedance for the low frequency tube 2. This load impedance amounts in the case illustrated in Fig. 1 to about $R_a=1/S$, wherein S is the characteristic impedance of the tube 1. If the band width of the circuits connected to the high frequency tube 1 is sufficiently dimensioned, $1/S$ will represent approximately a real impedance with reference to the whole transmission range.

It is especially in the case of television transmitters extraordinarily important to make the frequency course of the modulation independent of the carrier value, that is, independent of the brightness value obtaining at any time. The circuit according to Fig. 1 exhibits a frequency course depending upon the carrier level. The reasons are as follows:

(1) The load impedance of the low frequency tube 2, represented by the high frequency tube 1, depends upon the amplitude of the high frequency carrier or rather, upon its brightness level because the value S changes with the working point in accordance with the brightness value. This results in non-linearity of the modulation characteristic.

(2) Due to the unavoidable capacitances, especially the grid-cathode capacitance of the tube 1 as well as the output capacitance of the tube 2, there will arise a frequency-dependent load in parallel with the load impedance $1/S$, resulting in the frequency course of the modulation.

Both these factors produce a frequency dependence of the modulation, the frequency course becoming additionally dependent upon the amplitude of the carrier or the brightness level.

It would at first seem feasible to linearize the modulation characteristic by means of a known feedback circuit.

It is, for example, known to connect a resistor to the cathode of the modulation tube and to feed the voltage drop thereof in a feedback circuit to a preceding stage. The corresponding kind of feedback provides for linearization of the characteristic at low frequencies, but the previously mentioned frequency-level dependence remains as a drawback.

An attempt to equalize this frequency dependence by means of an additional feedback (Television Equipment Theory and Operation; Manual for Television Technical Training Program; RCA, 1953) likewise fails to eliminate the explained drawback.

It is possible and known, to provide for linearization by rectifying the high frequency output voltage and to conduct the modulation oscillations for linearization, in feedback sense, to a stage of the input amplifier. This expedient has, however, the disadvantage of amplifying frequencies which should not be transmitted and which are raised by the feedback arrangement. It must be considered in addition, that the transmitted frequency band is in the case of television transmitters in part non-symmetric, so that linearization by way of a feedback rectifier will not lead to the desired result.

It has further been proposed to provide as an auxiliary load for the low frequency tube a rectifier with an opposing voltage of such value that the rectifier begins to pass current when the working point of the high frequency tube is within the range of the lower part of the characteristic impedance curve of the tube. The corresponding arrangement makes it possible to linearize the frequency course and also the operating characteristic, but it has the disadvantage of requiring considerably increased expenditure of parts as compared with a suitable feedback coupling.

The object of the invention is to provide with simple means for linearization of the modulation characteristic and at the same time for independence thereof on the carrier frequency level.

In accordance with the invention, assuming a circuit designed for amplitude modulation especially modulation of television transmitters with picture frequency mixtures and comprising a high frequency amplifier tube as a load for a modulation tube, there is provided a feedback resistor in the feed line for the plate current supply of the high frequency amplifier tube, and the low frequency voltage drop thereof is conducted back to a low frequency stage. The high frequency tube, in a preferred embodiment of the invention, is connected in a basic grid circuit.

The invention will now be explained with reference to Fig. 2.

The high frequency amplifier tube 1 of Fig. 2 is, as in Fig. 1, connected in series with the terminal tube 2 of the modulation amplifier. The plate voltage of both serially connected tubes is connected together at points 3 and 4. In the feed line for the negative plate voltage, that is, between the point 4 and the control grid of the high frequency amplifier tube 1, there is provided a feedback coupling resistor 10. The low frequency feedback voltage arising at the resistor 10 is connected over conductor 11 to an amplifier tube 12 of a preamplifier of the modulation amplifier.

The circuit illustrated in Fig. 2, showing the principle of the invention, is intended to explain the invention. There are within the invention other circuit possibilities, especially for feedback to a stage of the modulation amplifier the feedback voltage produced at the coupling resistor 10.

Changes may be made within the scope and spirit of the appended claim.

I claim:

In a circuit for use in amplitude modulation wherein a high-frequency amplifier tube, having grid, cathode and anode elements is connected as a load of a modulation tube having grid, cathode and anode elements, the cathode of said modulation tube being grounded, means for connecting the cathode of the high-frequency amplifier tube with the anode of the modulation tube, means for operatively applying a carrier frequency source to the high-frequency amplifier tube operative to vary the anode current thereof, means including an amplifier for operatively applying a comparatively low-frequency source to the grid of the modulation tube, means for connecting the high-frequency amplifier tube to the supply lines of an ungrounded anode current supply, and a feedback circuit including a resistance in series with the negative supply line to ground, a low frequency voltage drop being produced across said resistance as a result of the flow of anode current in said supply line, a low frequency stage of said modulation amplifier being operatively connected to the feedback circuit at the ungrounded side of said feedback resistance and thus relatively removed from the modulator tube and independent of interelectrode capacities thereof.

References Cited in the file of this patent

UNITED STATES PATENTS

| | | |
|---|---|---|
| 2,032,193 | White | Feb. 25, 1936 |
| 2,245,616 | Soller | June 17, 1941 |
| 2,728,892 | Gluyas | Dec. 27, 1955 |
| 2,763,733 | Coulter | Sept. 18, 1956 |